United States Patent [19]
Hanaway

[11] Patent Number: 5,375,932
[45] Date of Patent: Dec. 27, 1994

[54] GUIDE POST, GUIDE SLEEVE AND IMPROVED AIR IMPULSE ROTARY BALL CAGE ASSEMBLY

[76] Inventor: Ronald L. Hanaway, 30210 E. Eight Mile Rd., Farmington Hills, Mich. 48236

[21] Appl. No.: 81,590

[22] Filed: Jun. 23, 1993

[51] Int. Cl.⁵ .............................................. F16C 29/04
[52] U.S. Cl. .................................. 384/49; 384/30
[58] Field of Search ................................ 384/30, 49

[56] References Cited

U.S. PATENT DOCUMENTS

| | | |
|---|---|---|
| 2,422,775 | 6/1947 | Conner . |
| 2,774,430 | 12/1956 | Blazek . |
| 2,846,278 | 8/1958 | Blazek . |
| 2,987,348 | 6/1961 | Blazek . |
| 3,092,425 | 6/1963 | Conner . |
| 3,253,868 | 5/1966 | Danly ................................ 384/30 |
| 3,357,755 | 12/1967 | Danly . |
| 3,514,166 | 5/1970 | Coley . |
| 3,614,178 | 10/1971 | Stamm ................................ 384/30 |
| 3,752,540 | 8/1973 | Bosworth . |
| 4,648,727 | 3/1987 | O'Neil . |
| 4,664,534 | 5/1987 | Hanaway . |
| 4,717,265 | 1/1988 | Shioda et al. ................ 384/30 X |

Primary Examiner—Daniel P. Stodola
Assistant Examiner—John P. Darling
Attorney, Agent, or Firm—Dykema Gossett

[57] ABSTRACT

In combination, a guide post, a coaxial ball bearing cage adjustably receiving the guide post and adapted for longitudinal and rotary movements. A coaxial guide sleeve upon a support adjustably receives the cage and post. A coiled spring within the sleeve is mounted upon the support and yieldably supports the ball cage. An apertured cap upon the sleeve loosely receives the cage and has an inlet adapted for connection to an air source. Pressurized air is directed into the cap for angular impingement upon the cage for rotating the cage relative to the sleeve. As a modification the spring is replaced by a pressurized air source.

9 Claims, 3 Drawing Sheets

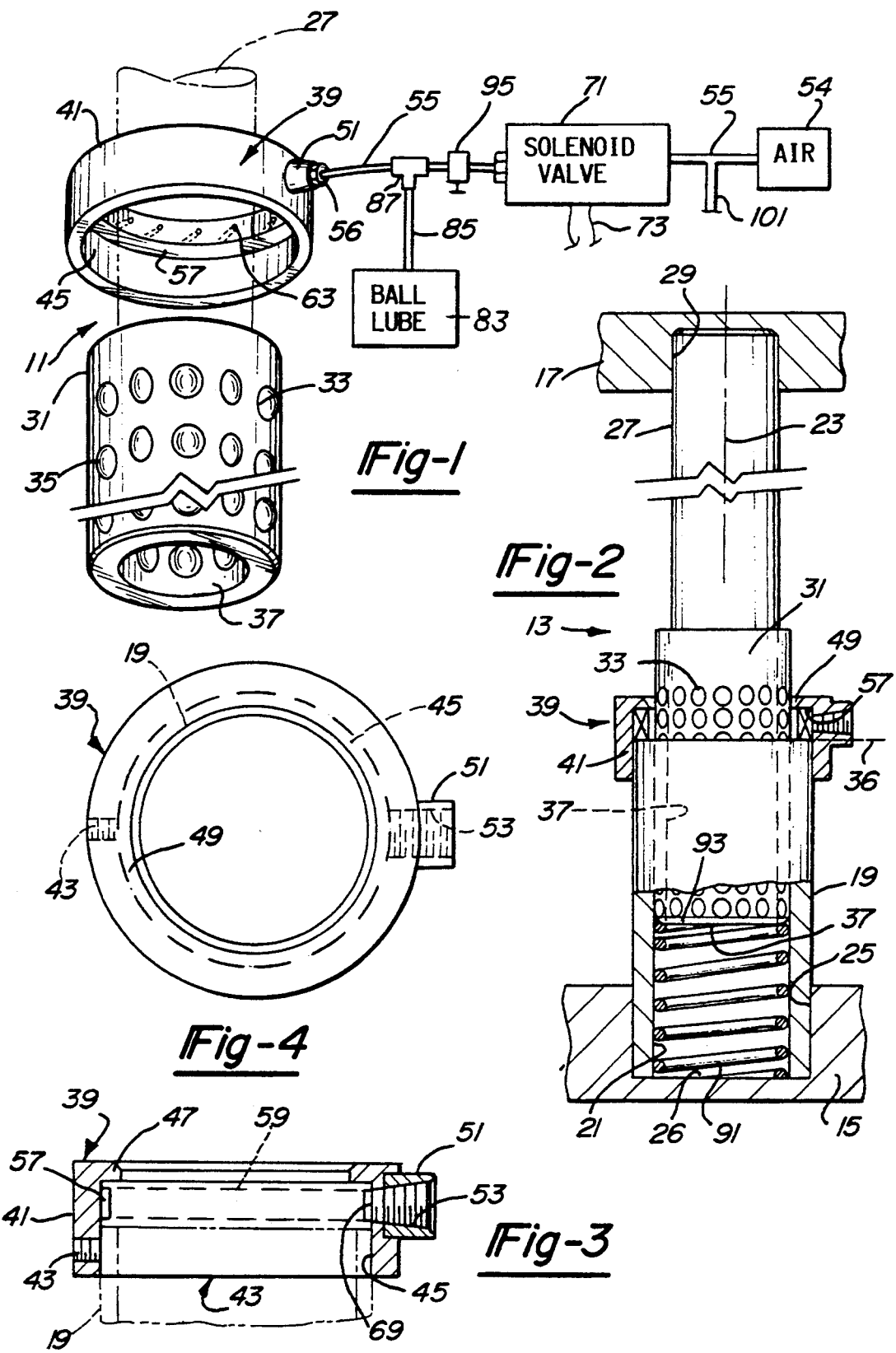

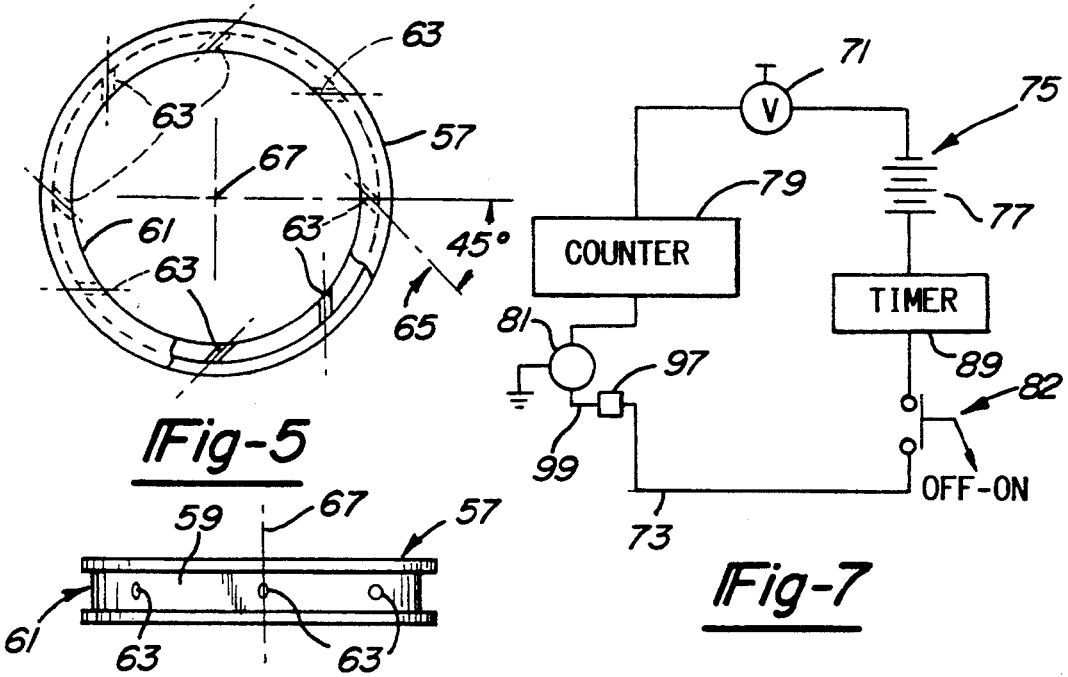
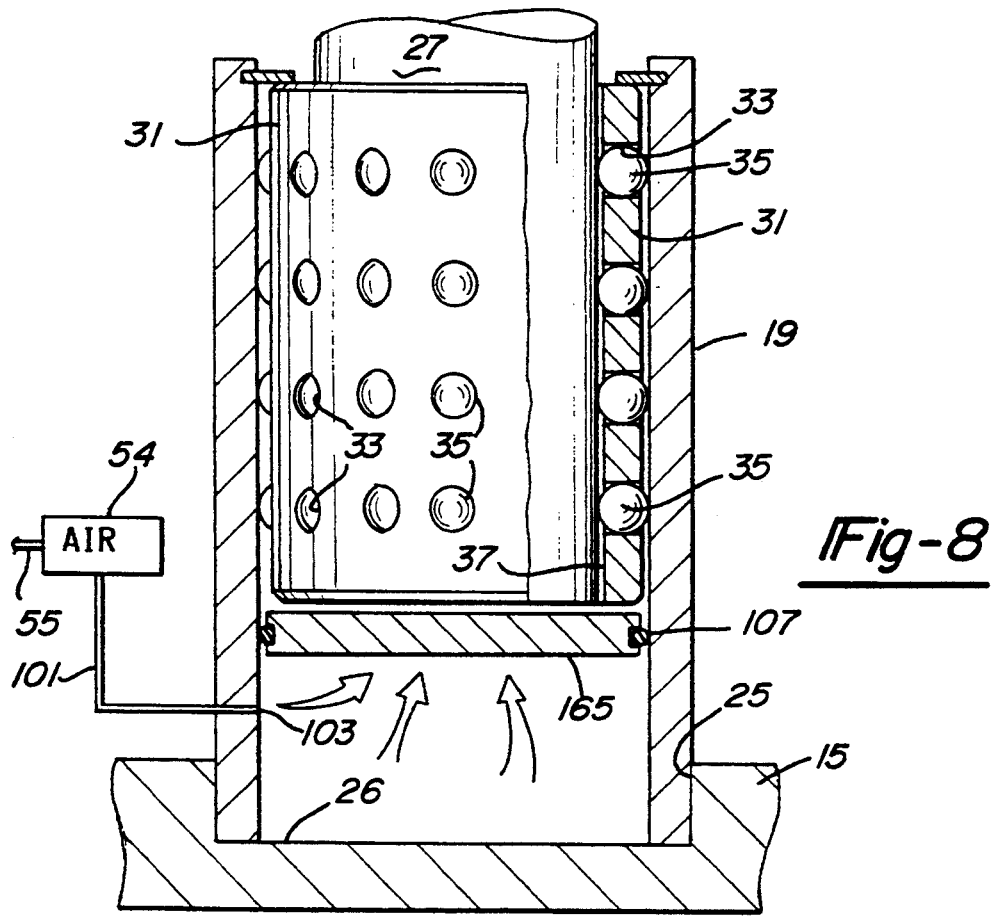

GUIDE POST, GUIDE SLEEVE AND IMPROVED AIR IMPULSE ROTARY BALL CAGE ASSEMBLY

FIELD OF THE INVENTION

The present invention relates to the assembled guide post, guide sleeve and ball bearing cage, such as may be used with a die set assembly.

BACKGROUND OF THE INVENTION

In the guide sleeve, guide post and bearing assembly of U.S. Pat. No. 4,664,534 dated May 12, 1987, of the present inventor, one disadvantage of that construction was the predictability and extent of relative rotary movement of the ball cage with respect to the guide post to prevent tracking of the balls along the surface of the guide post and guide sleeve.

In said earlier patent, possibly others, as for example, U.S. Pat. No. 4,648,727, it was believed advantageous to have some relative rotary movement of the ball cage with respect to the guide post and sleeve. This related to rotation of the ball bearing assembly with respect to the axially related guide post and the external guide sleeve to avoid tracking thereupon by the bearings.

THE PRIOR ART

Listed below are additional patents relating to the general combination of a guide post, guide sleeve and a ball bearing assembly.

| PATENT NO. | NAME | DATE |
| --- | --- | --- |
| 2,422,775 | G. O. Connor | June 24, 1947 |
| 2,774,430 | W. J. Blazek | December 18, 1956 |
| 2,846,278 | W. T. Blazek | August 5, 1958 |
| 2,987,348 | W. T. Blazek | June 6, 1961 |
| 3,092,425 | G. O. Conner | June 4, 1963 |
| 3,357,755 | J. C. Danly | December 12, 1967 |
| 3,514,166 | S. E. Coley | May 26, 1970 |
| 3,752,540 | D. Bosworth | August 14, 1973 |
| 4,648,727 | J. O'Neil | March 10, 1987 |
| 4,664,534 | R. Hanaway | May 12, 1987 |

Previously with guide post, guide sleeve and ball bearing assemblies there was not known any means for positively assuring incremental rotary movements of the ball cage or ball bearing assembly with respect to the guide post and guide sleeve.

RELATED APPLICATION

Applicant's copending application Ser. No. 802,825 filed Dec. 6, 1991 included a guide post, guide sleeve together with an air impulse rotary ball cage.

SUMMARY OF THE INVENTION

An important feature of the present invention is to provide in combination with a guide post, a guide sleeve and a ball bearing cage, together with a resilient spring support for said ball cage.

As another feature there is provided mechanical or other means for effecting relative rotary movement of the ball cage with respect to the guide post and guide sleeve.

Another feature is to provide in combination with a guide post, a cylindrical ball bearing cage coaxially mounted thereon and adapted for relative longitudinal and rotary movements thereon. A guide sleeve is adapted to receive the cage and guide post. An apertured cap loosely receives the ball cage and is mounted over the guide sleeve. The cap has an inlet to its bore adapted for connection to a pressurized air source. The air source is adapted to direct pressurized air towards surface portions of the ball bearing cage to mechanically rotate the ball bearing cage on its axis.

As another feature there is positioned within said cap an apertured turbine ring loosely surrounding the cage. Said ring includes a plurality of angularly related turbine passages for receiving pressurized air from the cap inlet and for impinging pressurized air at an acute angle to and around said cage for rotating said cage relative to said guide post and sleeve.

As another feature there is provided a normally closed valve means interposed upon the tube conducting pressurized air to said cap. The valve means when opened allows passage of compressed air to said turbine openings.

As a further feature the valve means may be in the form of a solenoid control valve or other air valve electrically controlled or may be a manual control valve.

As another feature there is provided an electrical circuit connected to a power source, and to said valve means to intermittently energize and open said valve means.

As another feature the electrical circuit includes a preset adjustable timer switch adapted to deactivate the valve means after a preset period.

As another feature the electrical circuit includes a normally open counter switch for closing the circuit after a preset number of relative movements between the post and the sleeve. This may be used in a die set, for illustration, including relatively movable upper and lower die shoes.

As another feature the electrical circuit includes a normally open proximity or limit switch located adjacent an elevated point of the guide post, adapted to close after partial separation of the post and sleeve sufficient to release the preload between the post, ball cage and sleeve.

As still another feature of the present invention there is incorporated within the cap which receives the ball bearing cage an air impeller assembly connected to a source of pressurized air, adapted for directing pressurized air at an acute angle to exterior surface portions of the ball cage for rotating the ball cage relative to said sleeve and post.

As another feature a column of pressurized air is used as a resilient support for the ball cage.

These and other features and objects will be seen from the following specification and claims in conjunction with the appended drawings.

THE DRAWINGS

FIG. 1 is a fragmentary perspective view of the present air impulse rotary ball cage assembly.

FIG. 2 is a fragmentary sectioned elevational view of the present guide post, guide sleeve and air impulse ball bearing assembly.

FIG. 3 is a side elevational view of the air cap shown in FIG. 2, and on an increased scale.

FIG. 4 is a plan view thereof.

FIG. 5 is a plan view of the turbine ring shown in FIG. 2.

Figure 9:
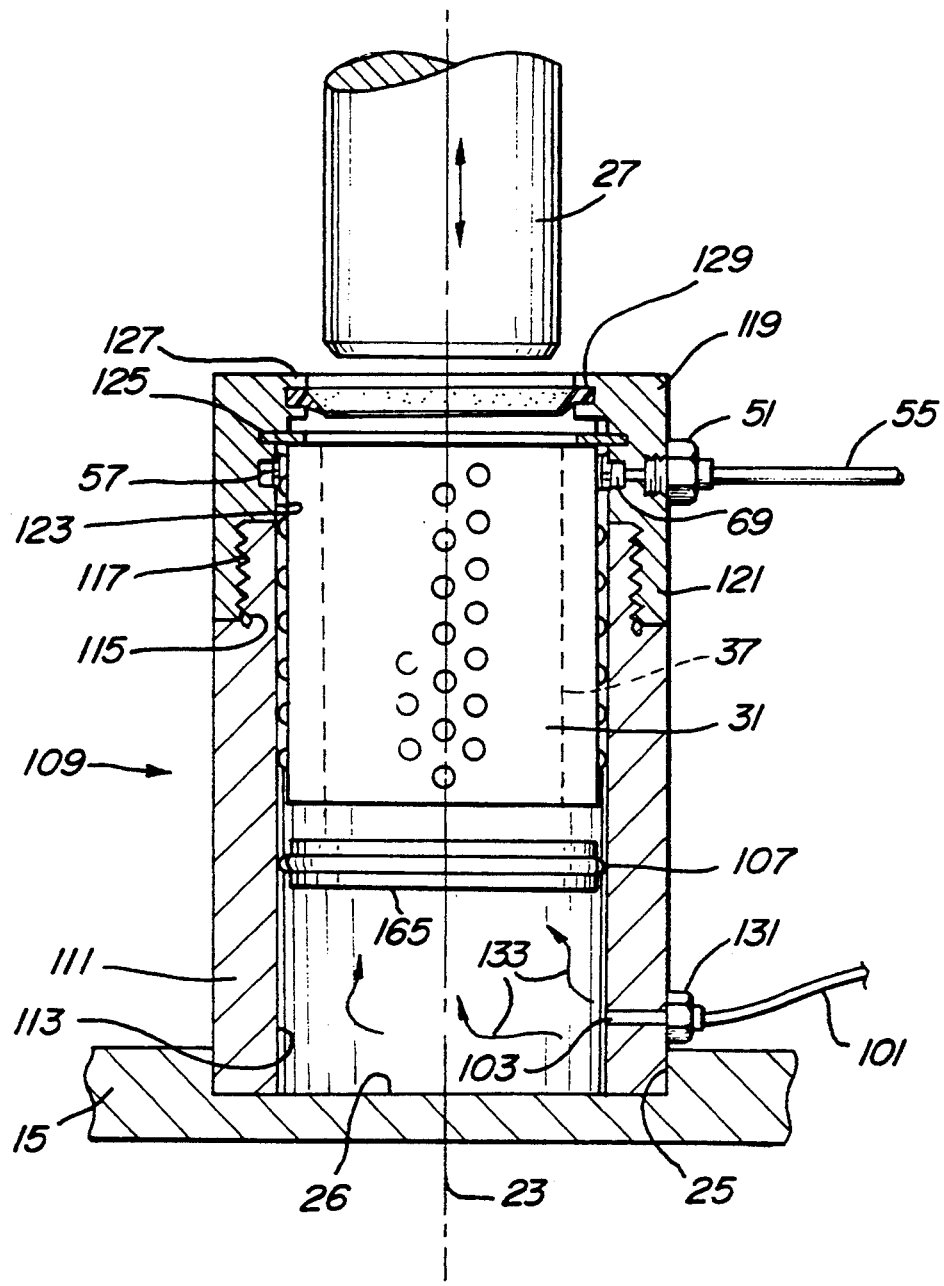

FIG. 6 front elevational view thereof.

FIG. 7 is a schematic electrical diagram of the electrical circuit involving a power source, air valve, timer switch, counter switch and proximity switch.

FIG. 8 is a fragmentary longitudinal section of a portion of the assembly shown in FIG. 2, on an increased scale, replacing the spring with a pressurized air source.

FIG. 9 is a vertical section of a modification of FIG. 8 with air impulse of FIG. 2 included.

It will be understood that the above drawings illustrate preferred embodiments of the invention, and that other embodiments are contemplated within the scope of the claims hereafter set forth.

DETAILED DESCRIPTION OF AN EMBODIMENT

In FIG. 2 portions of a die set assembly 13 are fragmentarily shown. The lower die shoe is shown at 15 and an upper die shoe is designated at 17. Guide sleeve 19, having a bore 21 and a central longitudinal axis 23 is press fitted into bore 25 formed in die shoe 15 and providing support 26 for spring 91.

The axially aligned guide post 27, fragmentarily shown, having a corresponding longitudinal axis 23 is press fitted within aperture 29 in upper die shoe 17. Cage 31, hereafter sometimes referred to as a ball bearing retainer, is of cylindrical form and includes a series of longitudinally spaced circles of spaced apertures 33 within which are nested and retained a plurality of spaced ball bearings 35. The ball bearings are circularly arranged and project inwardly and outwardly respectively, of the ball cage and are engageable with post 27 and with the bore 21 of guide sleeve 19.

In normal operation the guide post, guide sleeve and ball bearing assembly are mounted with respect to die set 13. Suitable dies and punches, not shown, may be applied respectively to die shoes 15 and 17. The preload line 36, FIG. 2, extends transversely of the open end of sleeve 19. This corresponds to a preload condition wherein with relative movement of guide post 27 downwardly with respect to guide sleeve 19 and with respect to ball bearing cage 31, there is such oversize relationship of the ball bearings 35 with respect to the guide post and guide sleeve of about one thousandths of an inch, for illustration. This creates a preload in the assembled relationship, FIG. 2.

For the purpose of the present disclosure during the phase of operation of the present impulse ball bearing cage and its rotation, there has been such relative movement between the die shoes 15 and 17 such that guide post 27 has been partly lifted above the preload line 36. At this position the ball cage 31 is not constrained frictionally against rotary movement.

The present ball bearing cage 31 includes a longitudinal bore 37, FIG. 2. Cap 39, FIGS. 2, 3 and 4, sometimes referred to as a turbine cap, includes annular body 41 having an axial bore 45 of about the diameter of sleeve 19 and has an internal annular top flange 47. Said cap is press fitted over sleeve 19. Set screw 43 may be used to anchor said cap to said sleeve.

Apertured cap 39 has a bore defined by annular flange 47 which loosely receives ball cage 31, FIGS. 1 and 2. The axial aperture within annular flange 47 defines with ball cage 31 an annular air gap 49 of approximately 0.010".

Plug fitting 51 projects into body 41 of cap 39 and includes a pipe thread 53, FIG. 4. A pressurized air supply 54, FIG. 1, generates pressures in the range of 60 to 100 psi. In the illustrative embodiment this is 80 psi. Said air source is connected to air hose 55. The hose in the illustrative embodiment is constructed of a polyethylene plastic material.

The air supply hose or tube 55 at one end includes a fitting 56, which is threaded into plug 51 for communicating pressurized air to the interior of air cap 39.

Turbine ring 57, FIGS. 5 and 6, includes an annular body 61 having therein an annular channel 59 for communication with bore 47 within said cap adjacent air inlet 51. A plurality of angularly related acute angular openings 63 extend through body 61 within channel 59. These extend inward at the acute angles shown.

The angular openings, sometimes referred to as turbine openings, are arranged in the illustrative embodiment at a 45 degree angle with respect to a normal extending through the axis 67 of turbine ring 57, FIG. 5. This is shown at 65.

The annular channel 59, FIG. 6, in conjunction with bore 45 of cap 39 defines an annular plenum chamber 69 in communication with the impeller type angular passages or openings 63, FIG. 3.

Axially apertured turbine ring 57 is nested within bore 45 of cap 39. The plurality of angularly related turbine openings 63 receive pressurized air from inlet 51 on said cap and deliver said air at an acute angle to and around the surface of cage 31. This rotates said cage relative to sleeve 19 and guide post 27.

Coiled spring 91, FIG. 2, is loosely nested within sleeve 19, rests upon support 26 and at one end yieldably supports cage 31. A low friction washer 93, of Teflon TM may be interposed. As an alternative the cage 31 may be yieldably supported by a column of compressed air within sleeve 19. Pressure air source 54 is shown in FIG. 8, having a branch pipe 101 which extends into sleeve 19 at 103. A piston 165 loosely underlies cage 31, within sleeve 19. Said piston is constructed of aluminum or a plastic material and includes O-ring 107 loosely engaging said sleeve.

The normally closed solenoid control valve 71, sometimes referred to as an air valve, FIGS. 1 and 7 is interposed within air line 55. Said valve controls and permits the flow of pressurized air from source 54 to and through air cap body 41 and through the turbine ring 57 and through the corresponding angular passages 63 for impingement of pressurized air upon exterior surface portions of ball cage 31. This effectively rotates the ball cage, counterclockwise, in the illustrative embodiment.

Air valve 71 is connected into circuit 75 by lead 73, FIG. 7, including electrical power source 77, 120 volts, AC.

Said circuit includes normally open counter switch 79, which can be preset to close after there has been a predetermined number of relative movements between upper die shoe 17 and lower die shoe 15, FIG. 2, and correspondingly between guide post 27 and guide sleeve 19. For illustration, the counter switch 79 may be set for 100 such reciprocation after which the counter switch closes to partly close the electrical circuit 75.

Connected into the circuit is a normally open proximity switch 81 or equivalent limit switch. Said switch is positioned adjacent a portion of the upper die shoe 17, when in its uppermost position relative to die shoe 15, FIG. 2. It is desirable that the proximity switch function to close the circuit at a time when the guide post has been sufficiently separated from guide sleeve 19 and ball bearing cage 31 of FIG. 2, relative to preload line 36.

Lubricant container 83, FIG. 1, contains a suitable lubricant sometimes referred by the trademark BALL-LUBE. In the schematic illustration, FIG. 1, hose 85 has an inlet which extends into vented lube container 83. At its other end it is connected to atomizer 87 on hose 55 to provide a flow of pressurized atomized lubricant into cap 39.

The electrical circuit further includes an adjustable normally closed timer switch 89, FIG. 7, which is preset for a predetermined number of seconds as desired for the flow of pressurized air into cap 39. With air hose 55 open to pressure air source 54, a normally closed manual air control valve 95, FIG. 1, can regulate the duration of air flow and continued rotations of ball cage 31, if valve 71 is open.

Counter switch 79, FIG. 7 is identified as a Red Lion Gemini 1,000 counter, model no. GEM-10-000/A manufactured by Red Lion Co., York, Pa.

Proximity Switch 81, FIG. 7, is referred to as "Efector Proximity Switch—model no. 8036AL15NL-3DABX, manufactured by Efector Company, King of Prussia, Pa.

The air valve 71, referred to as Asco air valve, is identified as model no. 8210B20-120V.A.C/60 cycle, manufactured by Automatic Switch Company, Florham Park, N.J.

According to the schematic diagram, FIG. 7, there is provided a transformer 97. The transformer 97 through lead 99, connects with proximity switch 81. Said switch is normally positioned adjacent upper die shoe 17 when in its raised position relative to lower die shoe 15. It is at this time that the proximity switch 81 is activated or closed to close the circuit to air valve 71, assuming the intervening normally open other switches 79, 89 are closed. Further detail of this circuit is shown in my copending application Ser. No. 802,825 filed Dec. 6, 1991.

These switches include counter switch 79 which is normally open. It is closed after a preset number of reciprocations of the upper die shoe 17, such as 100 movements. After that the air valve 71 is opened for applying pressurized air to air cap 39. This effects rotation of ball bearing cage 31. This may be for less than one rotation or several rotations. Pressurized air flows when air valve 71 which has been electronically opened for direction of pressurized air through pipe 55 to cap 39.

Interposed in pipe 55 is a manual air control valve 95 wherein air flow is established. Air through conduit 55 may be manually controlled by manual application of valve 95 for maintaining the flow for the number of seconds desired. This affects a random rotation of ball bearing assembly 31 with respect to guide sleeve 19 and guide post 27. For manual control of air flow, valve 71 is open.

By the present construction there will be an intermittent rotation of the ball bearing assembly 31 one or a plurality of rotations or for a portion of a rotation. The effect of this rotation is that it provides a means of reducing tracking of the balls in the ball bearing cage with respect to the guide sleeve and guide post. This provides for less wear of the guide post, guide sleeve and cage and a longer service life of the assembly.

MODIFICATION

A modified guide post, guide sleeve and rotary ball bearing and air impulse rotary ball bearing assembly is shown at 109 in FIG. 9. The corresponding guide post 27, FIG. 2, is adapted for reciprocal movements with respect to modified guide sleeve 111.

Guide sleeve 111 is nested within corresponding bore 25 of lower die shoe 15, fragmentarily shown, defining support 26 or closure for said guide sleeve, as described with respect to FIG. 2.

Sleeve 111 has a bore 113 adapted to cooperatively receive ball cage 31. Said cage is reciprocally movable within sleeve 111 and includes an axial bore 37 for receiving portions of guide post 27 during its reciprocal movements relative to guide sleeve 111.

Sleeve 111 terminates in the end extension 115 of reduced diameter and is threaded at 117. Screw top cap retainer 119, of the same diameter as sleeve 111, includes a depending threaded shank 121 which is assembled over one end of guide sleeve 111 to the position shown in FIG. 9.

Cap 119, similar to the cap 39 above described with respective to FIGS. 1, 3 and 4, has a counterbore 123 into which an end portion of cage 31 moves. Within counterbore 123 is retained air impulse ring 57. It is the same as above described with respect to FIGS. 5 and 6 and including a series of angular air passages 63 adapted for directing pressurized air onto the exterior surface of cage 31 for effecting rotary movement thereof with respect to and within guide sleeve 111. Within bore 123 adjacent one end thereof is a washer 125 constructed of Teflon or a metallic washer having a Teflon coating.

The cap 119 includes a top flange 127 and adjacent thereto and nested within said cap is the annular wiper seal 129 of rubber or plastic material adapted for cooperative registry with guide post 27, fragmentarily shown.

Air tube 55 and fitting 51 for directing pressurized air through cap 119 and into plenum 69 is similar to the construction above described with respect to FIGS. 1–4. Adjacent and within plenum 69 is positioned and retained the annular air impulse ring 57, above described with respect to FIGS. 5 and 6.

Washer 125, constructed of Teflon or a Teflon coated washer is nested within one end of bore 123 and is adapted to receive guide post 27 upon downward movement thereof. Washer 125 is adapted to limit relative upward movement of ball cage 31 with respect to guide sleeve 111.

As above described the respective guide post 27, guide sleeve 111 and ball cage 31 are arranged along longitudinal axis 23 for relative movements. Floating piston 165 of lightweight plastic or aluminum, is loosely positioned within bore 113 of guide sleeve 111 and includes O-ring 107, the same as above described with respect to FIG. 8.

Branch conduit 101, FIG. 9 corresponds to the branch conduit shown in FIG. 8 through the fitting 131 at the lower end of sleeve 111 directs pressurized air through the passage 103 for delivery of pressurized air into bore 113 of said sleeve.

This thereby provides a column of air as designated by the arrows 133 provide a yielding support for ball cage 31, normally retaining said ball cage in the uppermost position shown, but yieldably mounted within sleeve 111.

This pressurized air acts upon the loose floating piston 105 which bears upon the underside of said ball cage relative to the axis 23 normally yieldably biasing said cage to the position shown in FIG. 9. The O ring 107 functions to reduce the amount of pressurized air escaping past piston 165.

The structure and operation is similar to what is shown in FIG. 8 but in more detail incorporating the present screw top cap 119 with its wiper seal 129. Accordingly, the screw top cap 119 together with washer 125 limits relative upward movements of ball cage 31 with respect to guide sleeve 111.

Having described my invention, reference should now be had to the following claims.

I claim:

1. In combination, a first support;
   a guide post having a longitudinal axis mounted upon said support;
   a cylindrical ball bearing cage having a coaxial bore adjustably receiving said guide post, and adapted for relative longitudinal and rotary movements;
   said cage mounting a plurality of spaced circularly arranged ball bearings extending substantially the length of said cage and projecting inwardly and outwardly thereof, respectively;
   a second support spaced from said first support;
   a guide sleeve having a coaxial bore mounted upon said second support;
   a compressed air source;
   a conduit from said source and extending into said sleeve building a pressurized air column for yieldably supporting said cage; and
   said cage and guide post being projected into said sleeve for relative longitudinal movement and for rotary movements of said cage relative to said guide post and sleeve.

2. In the combination of claim 1, further comprising a floating piston within said sleeve supportably underlying said cage.

3. In the combination of claim 2, further comprising an O-ring on said piston loosely engaging said sleeve.

4. In the combination of claim 1, further comprising a coaxial apertured cap having a bore loosely receiving said cage and mounted over said guide sleeve and retained thereon;
   said cap having an inlet connected to its bore adapted for connection to a compressed air source; and
   an axially apertured turbine ring means fixed within said cap loosely surrounding said cage and including a plurality of angularly related turbine openings for receiving pressurized air from said inlet and impinging pressurized air at an acute angle to and around said cage for rotating said cage relative to said sleeve and post.

5. In the combination of claim 4, further comprising said connection including a tube with a fitting at one end connected to said cap inlet and at its other end connected to said air source.

6. In the combination of claim 5, further comprising a normally closed valve means interposed upon said tube, said valve means when open feeding compressed air to said turbine openings.

7. In the combination of claim 6, further comprising the valve means being a solenoid control valve.

8. In the combination of claim 4, further comprising an apertured washer anchored within said cap bore adapted to receive said guide post and serving as a stop limiting longitudinal movements of said cage in one direction.

9. In the combination of claim 8, further comprising an annular wiper seal nested within said cap cooperatively receiving said guide post.

* * * * *